(12) United States Patent
Pegley et al.

(10) Patent No.: US 12,145,647 B2
(45) Date of Patent: Nov. 19, 2024

(54) DUAL SIDED BRACKET IN STEERING COLUMN FOR ENERGY ABSORPTION ROBUSTNESS

(71) Applicant: Steering Solutions IP Holding Corporation, Saginaw, MI (US)

(72) Inventors: Justin M. Pegley, Birch Run, MI (US); Benjamin D. Reichard, Saginaw, MI (US); Jason L. Myers, Saginaw, MI (US); Greg D. Brzezinski, Freeland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/303,689

(22) Filed: Apr. 20, 2023

(65) Prior Publication Data

US 2024/0351629 A1 Oct. 24, 2024

(51) Int. Cl.
*B62D 1/185* (2006.01)
*B62D 1/181* (2006.01)

(52) U.S. Cl.
CPC .............. *B62D 1/185* (2013.01); *B62D 1/181* (2013.01)

(58) Field of Classification Search
CPC ................................ B62D 1/185; B62D 1/181
See application file for complete search history.

(56) References Cited

U.S. PATENT DOCUMENTS

| 10,228,047 | B2 * | 3/2019 | Nunez | F16H 25/20 |
| 10,654,510 | B2 * | 5/2020 | Inoue | B62D 1/181 |
| 11,167,785 | B1 * | 11/2021 | Beach | F16H 25/20 |
| 2013/0233117 | A1 * | 9/2013 | Read | B62D 1/192 74/493 |
| 2015/0232117 | A1 * | 8/2015 | Stinebring | B62D 1/181 74/493 |
| 2016/0046318 | A1 * | 2/2016 | Stinebring | B62D 1/181 74/493 |
| 2019/0308654 | A1 * | 10/2019 | Schmidt | B62D 1/189 |
| 2022/0097750 | A1 * | 3/2022 | Maida | F16H 25/20 |

FOREIGN PATENT DOCUMENTS

| CN | 112424053 A | * | 2/2021 | ............. B62D 1/181 |
| WO | WO-2021193449 A1 | * | 9/2021 | ............. B62D 1/181 |

* cited by examiner

Primary Examiner — Drew J Brown
(74) Attorney, Agent, or Firm — Dickinson Wright PLLC

(57) ABSTRACT

A telescope mechanism for a steering column includes a jacket. The telescope mechanism also includes a telescope actuator housing mounted to the jacket. The telescope mechanism further includes a capture bracket positioned on the telescope actuator housing and mechanically fastened to the jacket on a first side of the telescope actuator housing and on a second side of the telescope actuator housing.

14 Claims, 4 Drawing Sheets

DUAL SIDED BRACKET IN STEERING COLUMN FOR ENERGY ABSORPTION ROBUSTNESS

FIELD OF THE INVENTION

The embodiments described herein relate to vehicle steering systems and, more particularly, to a dual sided bracket for energy absorption robustness.

BACKGROUND

A steering column assembly of a vehicle may be adjustable in a rake (tilt) direction and/or in a telescoping direction. Each of these adjustments may be carried out with respective power assemblies or mechanisms. The telescope drive system is mounted rigidly at one location, while another location moves in a linear direction, thus driving the component it is fixed to, resulting in a desired telescope travel. During a collapse event (e.g., energy absorption event) of some steering columns, the lower jacket tends to deflect or become damaged. This is not a desirable outcome.

SUMMARY

According to one aspect of the disclosure, a telescope mechanism for a steering column includes a jacket. The telescope mechanism also includes a telescope actuator housing mounted to the jacket. The telescope mechanism further includes a capture bracket positioned on the telescope actuator housing and mechanically fastened to the jacket on a first side of the telescope actuator housing and on a second side of the telescope actuator housing.

According to another aspect of the disclosure, a steering column assembly includes a lower jacket. The steering column assembly also includes an upper jacket in telescoping engagement with the lower jacket. The steering column assembly further includes a telescope mechanism. The telescope mechanism includes a telescope actuator housing mounted to the lower jacket, the telescope actuator housing at least partially containing a telescope actuator therein. The telescope mechanism also includes a lead screw operatively coupled to the upper jacket and driven by the telescope actuator to selectively move the upper jacket relative to the lower jacket. The telescope mechanism further includes a capture bracket positioned on the telescope actuator housing and mechanically fastened to the lower jacket on a first side of the telescope actuator housing and on a second side of the telescope actuator housing.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, illustrated are embodiments of a dual sided capture bracket for a telescope mechanism of a steering column.

Figure 1:
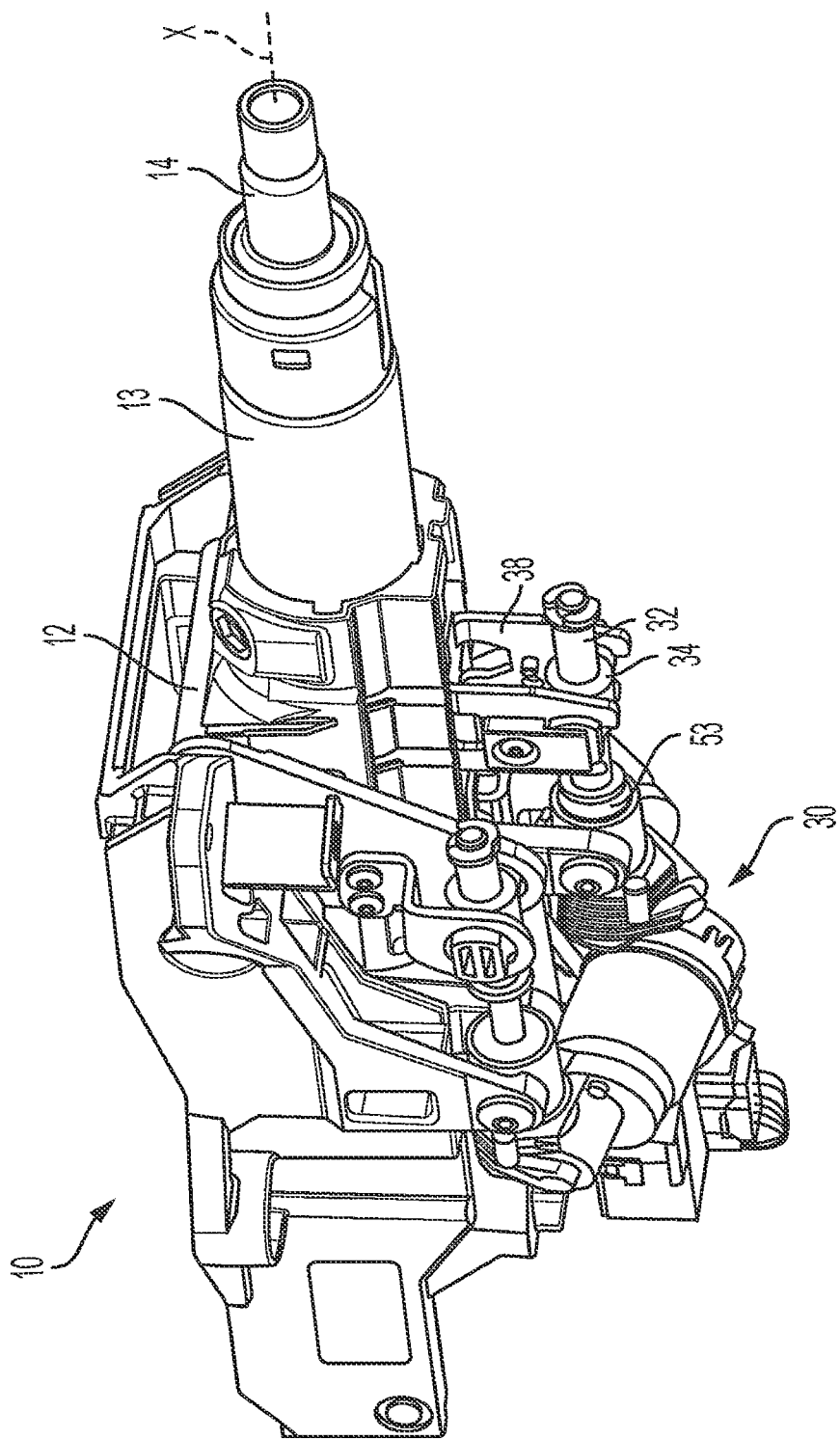
FIG. 1 is a perspective view of a first side of a steering column assembly.
Figure 2:
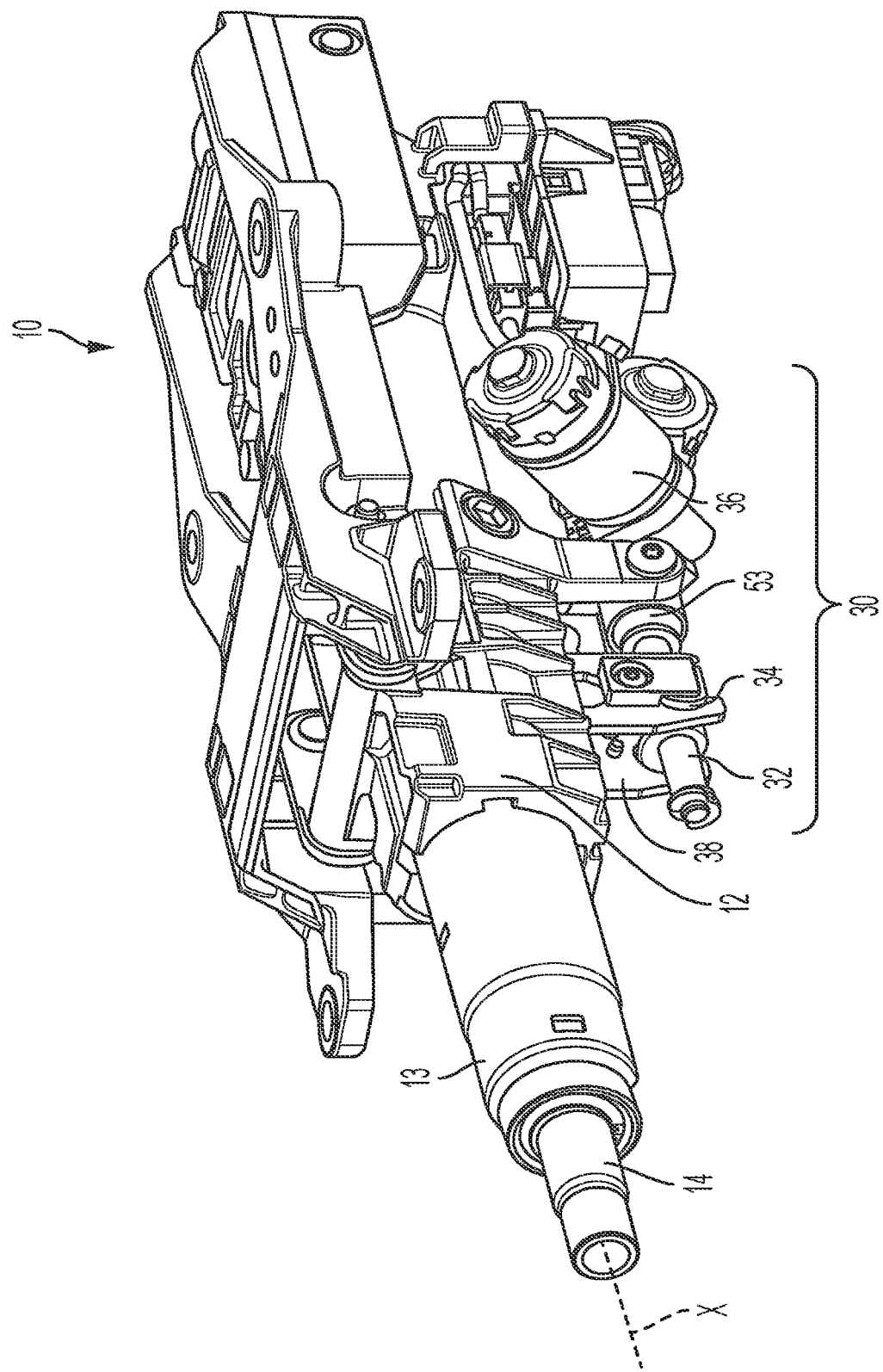
FIG. 2 is a perspective view of a second side of the steering column assembly.

FIGS. 1 and 2 illustrate a steering column assembly generally indicated with numeral 10. The steering column assembly 10 is for a vehicle and extends along a longitudinal axis X. The steering column assembly 10 may be adjustable in a telescopic direction generally parallel with the longitudinal axis X (i.e., adjustable along the longitudinal axis X), and may be adjustable in a rake/tilt direction in some embodiments. The steering column assembly 10 includes a lower jacket 12, an upper jacket 13, and a steering shaft 14 extending along the longitudinal axis X. The steering shaft 14 and the upper jacket 13 are operatively coupled to each other and disposed in telescoping engagement with the lower jacket 12. In other words, the steering shaft 14 has a portion disposed within the upper jacket 13 and a portion disposed within the lower jacket 12. The upper jacket 13 has a portion extending into the lower jacket 12 and is translatable therein.

A telescope actuator assembly 30 is provided to facilitate powered telescope adjustments of the upper jacket 13 and the steering shaft 14. The telescope actuator assembly 30 includes a leadscrew 32 having a nut 34 threaded thereto. A motor 36 rotatably drives the leadscrew 32 via a telescope actuator 53 to translate the nut 34 there along. The nut 34 is operatively coupled to the upper jacket 13 with a telescope drive bracket 38, such that linear movement of the nut 34 along the leadscrew 32 drives the upper jacket 13 to and from different telescope positions.

In the illustrated embodiments, the above-described components of the telescope actuator assembly 30 are substantially positioned on a lower side of the steering column assembly 10. However, it is contemplated that other orientations and positions are desirable.

Figure 3:
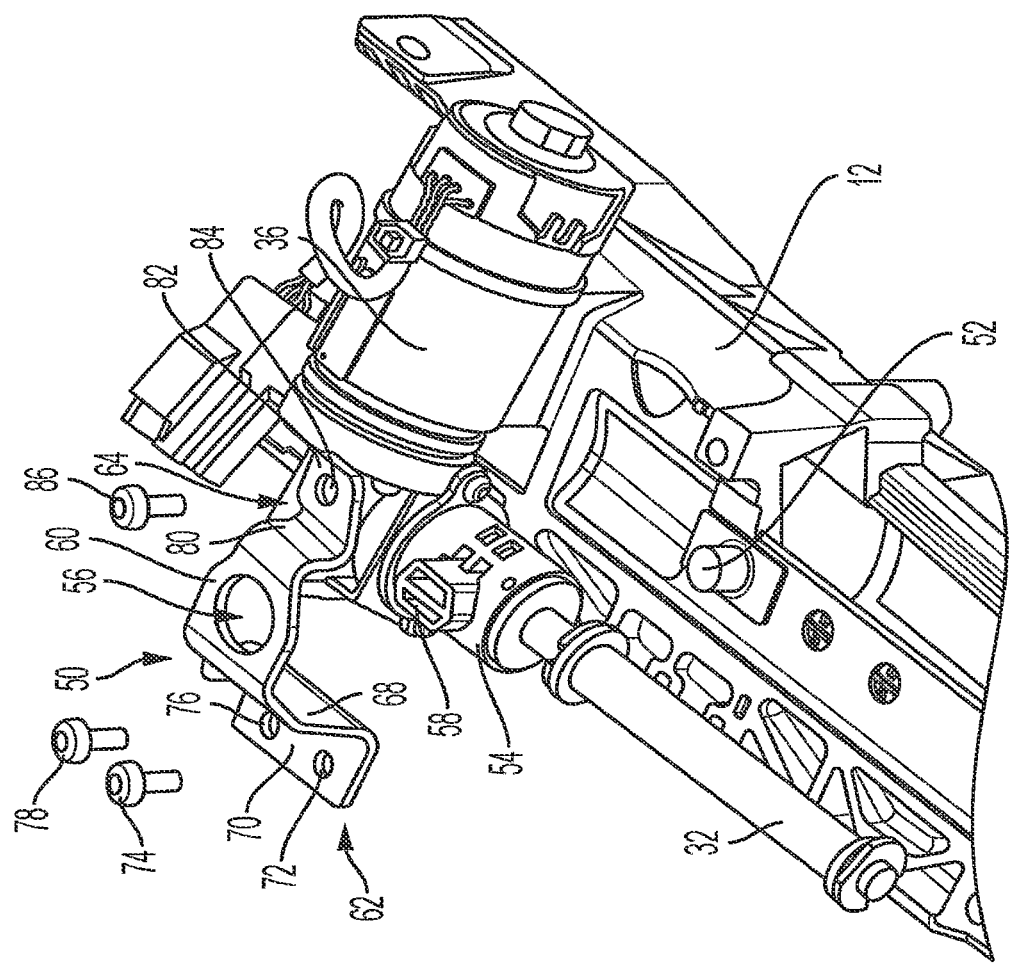
FIG. 3 is a perspective view of a dual sided capture bracket shown disassembled from the steering column assembly.
Figure 4:
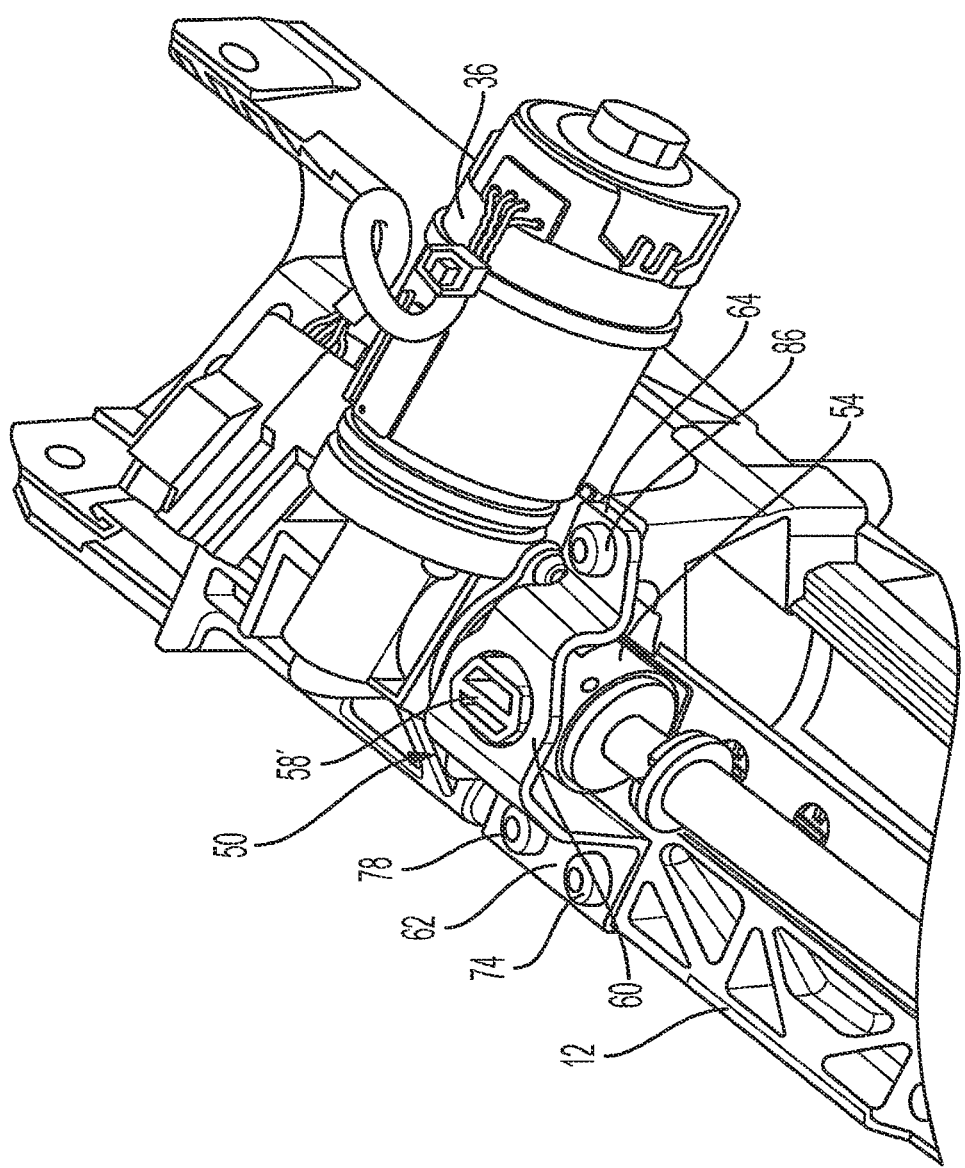
FIG. 4 is a perspective view of the dual sided capture bracket shown assembled to the steering column assembly.

Referring now to FIGS. 3 and 4, a capture bracket is shown and is generally referenced with numeral 50. The capture bracket 50 is operatively coupled to the lower jacket 12 with at least two fasteners, as described in detail herein. A telescope actuator housing 54 is located relative to the lower jacket 12 with a mounting post 52 extending from the lower jacket 12, as shown well in the disassembled condition of FIG. 3. The mounting post 52 is shown as a cylindrical structure integrally formed with the lower jacket 12, but it is to be appreciated that the mounting post 52 may be formed in other geometric configurations.

The capture bracket 50 is secured to the telescope actuator housing 54 which is mounted to the leadscrew 32 and is driven by the motor 36. In the illustrated embodiment, the capture bracket 50 defines a main opening 56 which receives a protrusion 58 extending from the telescope actuator housing 54. However, in other embodiments, a recess may be provided within the capture bracket 50 to position the capture bracket 50 on the telescope actuator housing 54.

The main opening 56 is defined within a body segment 60 of the capture bracket 50. A first leg 62 extends from a first side of the body segment 60 and a second leg 64 extends from a second side of the body segment 60-opposite the first side of the body segment 60. At least a portion of each of the first leg 62 and the second leg 64 extends to be located on opposite sides of the telescope actuator housing 54 in an assembled condition. In the illustrated embodiment, the first leg 62 and the second leg 64 are each of a substantially L-shaped configuration. In particular, the first leg 62 includes a first leg first portion 68 and a first leg second portion 70. The first leg first portion 68 extends directly from the first side of the body segment 60 and the first leg second portion 70 extends directly from the first leg first portion 68. The second leg first portion 70 defines a first fastener hole 72 configured to receive a first fastener 74 and a second fastener hole 76 to receive a second fastener 78. The first fastener 74 and the second fastener 78 may be screws, bolts or the like, and are threaded into holes of the lower jacket 12 to secure the first leg 62 of the capture bracket 50 to the lower jacket 12.

Similarly, the second leg 64 includes a second leg first portion 80 and a second leg second portion 82. The second leg first portion 80 extends directly from the second side of the body segment 60 and the second leg second portion 82 extends directly from the second leg first portion 80. The second leg second portion 82 defines a third fastener hole 84 configured to receive a third fastener 86. The third fastener 86 may be a screw, bolt or the like, and is threaded into a hole of the lower jacket 12 to secure the second leg 64 of the capture bracket 50 to the lower jacket 12. While the embodiment described above and illustrated includes two fasteners associated with the first leg 62 and a single fastener associated with the second leg 64, it is to be understood that a single fastener could be associated with the first leg 62 and more fasteners could be associated with the second leg 64 in any contemplated combination so long as at least one fastener is disposed on opposing sides of the capture bracket 50, and therefore on opposing sides of the telescope actuator housing 54.

In operation, an energy absorption assembly (not shown) that is operatively coupled to the upper jacket 13 absorbs energy during a collapse event of the steering column assembly 10. A reaction point for this energy absorption is the capture bracket 50, the telescope actuator housing 54 and indirectly the lower jacket 12. By providing at least one attachment point for the capture bracket 50 to the lower jacket 12 on both lateral sides of the telescope actuator housing 54—as opposed to a cantilevered attachment—the capture bracket 50 does not deflect due to redistribution of the energy absorption loading to at least one additional reaction point on the lower jacket 12. This eliminates lower jacket fractures and prevents the telescope actuator housing 54 from disengaging from the mounting post 52 of the lower jacket 12 during collapse. Therefore, the capture bracket 50 ensures that the telescope actuator housing 54 and associated components of the lower jacket 12 are robustly stabilized during an energy absorption event.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A telescope mechanism for a steering column comprising:
   a jacket;
   a telescope actuator housing mounted to the jacket; and
   a capture bracket positioned on the telescope actuator housing and mechanically fastened to the jacket on a first side of the telescope actuator housing and on a second side of the telescope actuator housing, wherein the first side and the second side of the telescope actuator housing are on opposite sides of the telescope actuator housing.

2. The telescope mechanism of claim 1, wherein the capture bracket comprises:
   a main body segment;
   a first leg extending from the main body segment and mechanically fastened to the jacket on the first side of the telescope actuator housing; and
   a second leg extending from the main body segment and mechanically fastened to the jacket on the second side of the telescope actuator housing.

3. The telescope mechanism of claim 2, wherein the capture bracket is positioned on the telescope actuator housing with a protrusion extending from the telescope actuator housing extending through a main opening defined by the main body segment of the capture bracket.

4. The telescope mechanism of claim 1, wherein the first leg defines a first fastener opening and a second fastener opening, the first fastener opening receiving a first fastener therethrough to secure the first leg to the jacket, the second fastener opening receiving a second fastener therethrough to secure the first leg to the jacket.

5. The telescope mechanism of claim 4, wherein the second leg defines a third fastener opening for receiving a third fastener therethrough to secure the second leg to the jacket.

6. The telescope mechanism of claim 1, wherein the telescope actuator housing is mounted to the jacket on a mounting post extending from the jacket.

7. The telescope mechanism of claim 6, wherein the mounting post is cylindrical.

8. A steering column assembly comprising:
   a lower jacket;
   an upper jacket in telescoping engagement with the lower jacket; and
   a telescope mechanism comprising:
      a telescope actuator housing mounted to the lower jacket, the telescope actuator housing at least partially containing a telescope actuator therein;
      a lead screw operatively coupled to the upper jacket and driven by the telescope actuator to selectively move the upper jacket relative to the lower jacket; and
      a capture bracket positioned on the telescope actuator housing and mechanically fastened to the lower jacket on a first side of the telescope actuator housing with a first fastener and a second fastener, and the capture bracket mechanically fastened to the lower jacket on a second side of the telescope actuator housing with a third actuator, wherein the axis of each of the first fastener, the second fastener and the third fastener are parallel to each other and perpendicular to a longitudinal axis of the lower jacket.

9. The steering column assembly of claim 8, wherein the capture bracket comprises:

a main body segment;

a first leg extending from the main body segment and mechanically fastened to the jacket on the first side of the telescope actuator housing; and a second leg extending from the main body segment and mechanically fastened to the jacket on the second side of the telescope actuator housing.

10. The steering column assembly of claim 8, wherein the first leg defines a first fastener opening and a second fastener opening, the first fastener opening receiving the first fastener therethrough to secure the first leg to the jacket, the second fastener opening receiving the second fastener therethrough to secure the first leg to the jacket.

11. The steering column assembly of claim 10, wherein the second leg defines a third fastener opening for receiving the third fastener therethrough to secure the second leg to the jacket.

12. The steering column assembly of claim 8, wherein the telescope actuator housing is mounted to the jacket on a mounting post extending from the jacket.

13. The steering column assembly of claim 12, wherein the mounting post is cylindrical.

14. The steering column assembly of claim 8, wherein the capture bracket is positioned on the telescope actuator housing with a protrusion extending from the telescope actuator housing extending through a main opening defined by the main body segment of the capture bracket.

* * * * *